United States Patent [19]
Duncan

[11] Patent Number: 6,062,406
[45] Date of Patent: May 16, 2000

[54] PIVOT PIN AND RETENTION CLIP ASSEMBLY FOR A RAILROAD CAR COUPLER

[75] Inventor: Scott R. Duncan, Lake Zurich, Ill.

[73] Assignee: NACO, Inc., Downers Grove, Ill.

[21] Appl. No.: 09/048,523

[22] Filed: Mar. 26, 1998

[51] Int. Cl.[7] .................................................. B61G 7/00
[52] U.S. Cl. ............................................................ 213/156
[58] Field of Search ................................... 213/155, 156; 16/380, 386

[56] References Cited

U.S. PATENT DOCUMENTS

| | | |
|---|---|---|
| 475,746 | 5/1892 | Assorati . |
| 530,766 | 12/1894 | Gaston . |
| 702,186 | 6/1902 | Chubb ...................................... 213/156 |
| 763,883 | 6/1904 | Harlow et al. . |
| 933,078 | 9/1909 | Kitzmiller . |
| 1,010,300 | 11/1911 | Murray et al. . |
| 1,358,930 | 11/1920 | Buhoup . |
| 1,634,429 | 7/1927 | Mechlin . |
| 1,747,484 | 2/1930 | O'Connor . |
| 1,751,150 | 3/1930 | Haseltine . |
| 2,817,129 | 12/1957 | Roberts et al. . |
| 2,817,130 | 12/1957 | Roberts et al. . |
| 3,131,444 | 5/1964 | Manning . |
| 3,417,437 | 12/1968 | Binnall et al. . |
| 3,805,337 | 4/1974 | Branstetter . |
| 4,858,279 | 8/1989 | Kato et al. . |
| 4,976,363 | 12/1990 | Altherr ...................................... 213/156 |
| 5,596,790 | 1/1997 | Möller . |
| 5,620,209 | 4/1997 | Sauer . |
| 5,630,519 | 5/1997 | Burke et al. ............................. 213/156 |
| 5,884,365 | 3/1999 | Kluting ...................................... 16/380 |

*Primary Examiner*—Mark T. Le
*Attorney, Agent, or Firm*—Lee, Mann, Smith, McWilliams, Sweeney & Ohlson

[57] ABSTRACT

A coupler pivot pin and retention clip assembly for a railroad car coupler adapted to pivotally connect a knuckle of the railroad car coupler to a body of the railroad car coupler. The pivot pin assembly includes a pivot pin having an elongate shank having a head at one end and a groove formed in the shank at a second end. A circular retention clip member is adapted to be selectively retained within the groove and to the shank to prevent removal of the pivot pin from the coupler. The retention clip member includes a generally circular band having a respective tab extending generally radially outwardly from each end of the band. The band is resiliently flexible from a relaxed position, wherein the band is adapted to be retained in the groove, to an expanded position, wherein the band has an enlarged diameter allowing the band to be removed from the groove and the pivot pin so that the pivot pin may be removed from the coupler, by manually pressing the first and second tabs together.

5 Claims, 1 Drawing Sheet

U.S. Patent
May 16, 2000
6,062,406
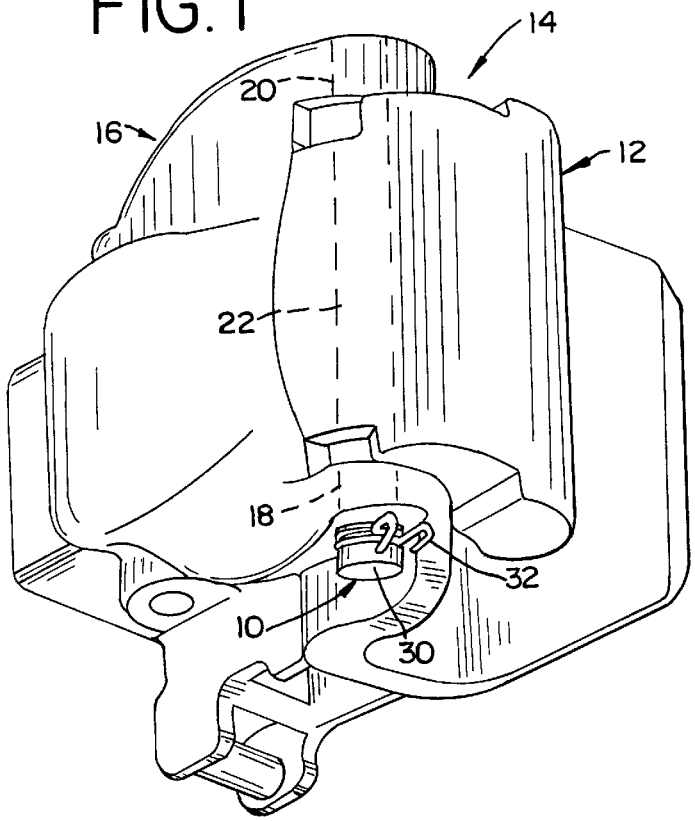
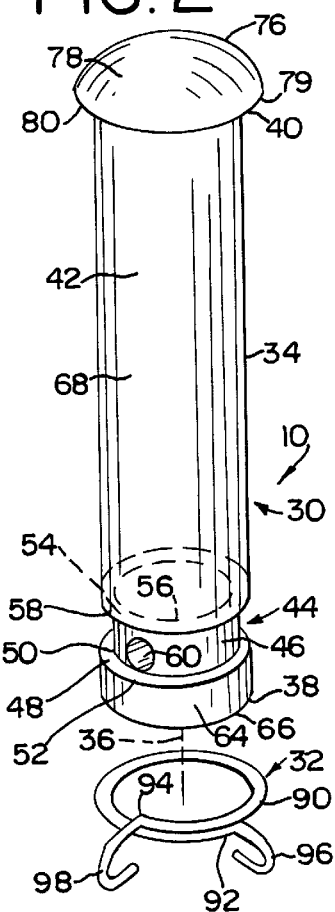
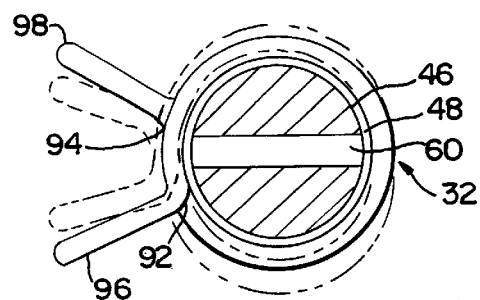
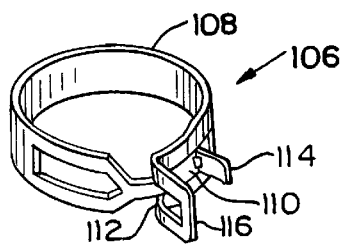
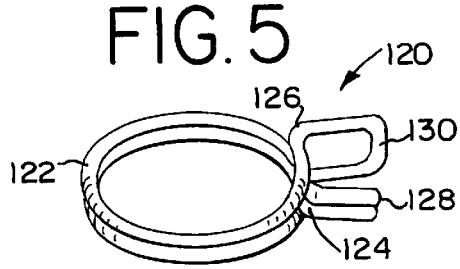

PIVOT PIN AND RETENTION CLIP ASSEMBLY FOR A RAILROAD CAR COUPLER

BACKGROUND OF THE INVENTION

The present invention is directed to a pivot pin and retention clip assembly for a railroad car coupler adapted to pivotally connect a knuckle of the railroad car coupler to a body portion of the railroad car coupler, and in particular to a pivot pin and retention clip assembly including a pivot pin having a shank with a head at one end and a peripheral groove formed in the shank at a second end adapted to selectively receive a generally circular retention clip member in order to prevent removal of the pivot pin from the coupler.

Pivot pins that have previously been used to pivotally connect the knuckle of a railroad car coupler to the body of a railroad car coupler have included a shank that was generally uniformly cylindrical from a first end to a second end of the shank. The pivot pin included a head formed at the first end of the shank and a bore that extended generally diametrically through the shank at the second end of the shank. The head prevented the first end of the shank from sliding through the knuckle and coupler body. A cotter pin was typically inserted through the bore in the shank and the legs of the cotter pin which extended outwardly beyond the shank were bent to secure the cotter pin to the second end of the shank. The cotter pin prevented the second end of the shank from sliding through the knuckle and coupler body. Hand tools such as pliers were generally required to bend the legs of the cotter pin after insertion. Hand tools were also required to straighten the legs of the cotter pin to substantially their original position, and to then pull the cotter pin outwardly through the bore, in order to remove the pivot pin from the shank. A cotter pin that has been removed from a pivot pin is typically not reusable and a new cotter pin is required when the pivot pin is to be secured in place again. In addition, the legs and the head of the cotter pin project outwardly from the shank of the pivot pin. When the pivot pin rotates with respect to the knuckle or the coupler body, the head or the legs of the pivot pin can catch on the knuckle or the coupler body to prevent rotation of the pivot pin with respect to the knuckle and/or coupler body.

SUMMARY OF THE INVENTION

A selectively releasable locking assembly for a railroad car coupler adapted to pivotally connect a knuckle of the railroad car coupler to a body of the railroad car coupler. The selectively releasable locking assembly includes a pivot pin and a retention clip member. The pivot pin includes an elongate shank having a first end, a second end, and a longitudinal axis extending between the first end and the second end. The shank includes an outer peripheral surface extending from the first end to the second end of the shank and that extends generally concentrically about the longitudinal axis. A peripheral groove is formed in the shank. The groove is spaced apart from the second end of the shank and extends generally concentrically about the longitudinal axis. The peripheral surface includes a first generally cylindrical surface portion extending from the first end of the shank to the groove, a second generally cylindrical surface portion extending from the groove to the second end of the shank, and a third generally cylindrical surface portion formed by the groove. The third surface portion is located between the first and second surface portions. A head having an outwardly extending lip and a rim is attached to the second end of the shank and is adapted to prevent the second end of the shank from sliding through the knuckle and body of the railroad car coupler.

The retention clip member includes a resiliently flexible generally circular band extending between a first end and a second end. The retention clip member also includes a first tab extending generally radially outwardly from the first end of the band and a second tab extending generally radially outwardly from the second end of the band. The band is adapted to be inserted within the groove of the pivot pin such that the band is located on diametrically opposite sides of the third surface portion formed by the groove and extends completely around and surrounds the shank. The band is resiliently flexible such that the band may be manually flexed from a relaxed position, wherein the first end of the band is located a first distance from the second end of the band, to an expanded position wherein the first end of the band is located a second distance from the second end of the band, such that the internal diameter of the band in the expanded position is larger than the internal diameter of the band in the relaxed position. The retention clip member is adapted to be retained in the groove when the band is in the relaxed position and is adapted to be selectively placed within or removed from the groove when the band is in the expanded position by sliding the retention clip member longitudinally over the first surface portion of the shank. The retention clip member is adapted to engage the pivot pin and prevent the first end of the pivot pin from sliding through the knuckle and body of the railroad car coupler when the retention clip member is located within the groove. The internal diameter of the band in the relaxed position is larger in diameter than the diameter of the third surface portion formed by the groove such that the retention clip member does not resiliently grip the shank and such that the retention clip member is freely rotatable about the longitudinal axis with respect to the shank within the groove.

BRIEF DESCRIPTION OF THE DRAWING FIGURES

FIG. 1 is a perspective view of a railroad car coupler showing the pivot pin and retention clip assembly of the present invention pivotally connecting the knuckle of the railroad car coupler to the body of the railroad car coupler.

FIG. 2 is a perspective view of the pivot pin and retention clip member of the pivot pin and retention clip assembly of the present invention.

FIG. 3 is a cross sectional view of the pivot pin showing the retention clip member located within the groove of the pivot pin in the relaxed position as shown in solid lines and in the expanded position as shown in dashed lines.

FIG. 4 is a perspective view of an alternate embodiment of the retention clip member.

FIG. 5 is a perspective view of another alternate embodiment of the retention clip member.

DETAILED DESCRIPTION OF THE PREFERRED EMBODIMENTS

A pivot pin and retention clip assembly 10 forms a selectively releasable locking assembly as shown in FIG. 1 that is adapted to pivotally connect a knuckle 12 of a railroad car coupler 14 to a body 16 of the railroad car coupler 14. The body 16 of the coupler 14 includes a lower lug having a vertical cylindrical bore 18 and an upper lug having a vertical generally cylindrical bore 20. The bores 18 and 20 are coaxially aligned with one another. The knuckle 12 extends between the lower lug and upper lug of the coupler body 16 and includes a vertical generally cylindrical bore 22. The bore 22 is coaxially aligned with the bores 18 and 20 of the coupler body 16. The bores 18, 20 and 22 have approximately the same diameter as one another.

As best shown in FIG. 2, the pivot pin and retention clip assembly 10 includes a pivot pin 30 and a retention clip member 32. The pivot pin 30 includes an elongate shank 34 having a central longitudinal axis 36. The shank 34 extends along the longitudinal axis 36 between a first end 38 and a second end 40. The shank 34 includes an outer peripheral surface 42 that extends generally concentrically about the longitudinal axis 36 from the first end 38 to the second end 40. The shank 34 also includes a peripheral recessed groove 44 formed in the shank 34 that extends circumferentially and generally concentrically about the longitudinal axis 36. The groove 44 is spaced apart from the second end 140 of the shank 34 such that the groove 44 will be located below the lower lug of the coupler body 16 when the pivot pin 30 is installed. The groove 44 forms a peripheral generally cylindrical surface 46 that is located generally concentrically about the longitudinal axis 36. The groove 44 forms a first generally circular side wall 48 that extends between an inner circular edge 50 that adjoins the grooved surface 46 and a coplanar outer circular edge 52. The first side wall 48 extends generally concentrically about and generally perpendicular to the longitudinal axis 36. The groove 44 also forms a second generally circular side wall 54 having an inner circular edge 56 adjoining the grooved surface 46 and a coplanar outer circular edge 58. The second side wall 54 extends generally concentrically about and generally perpendicular to the longitudinal axis 36 and is spaced apart from and generally parallel to the first side wall 48. A linear cylindrical bore 60 extends generally diametrically through the shank 34 and the grooved surface 46.

The peripheral surface 42 of the shank 34 includes a first generally cylindrical surface portion 64 that extends from a generally circular edge 66 at the first end 38 of the shank 34 to the circular outer edge 52 of the first side wall 48 of the groove 44. The peripheral surface 42 of the shank 34 also includes a second generally cylindrical surface portion 68 that extends from the second end 40 of the shank 34 to the circular outer edge 58 of the second side wall 54 of the groove 44. The peripheral surface 42 of the shank 34 also includes the cylindrical surface 46 formed by the groove 44. The first and second surface portions 64 and 68 extend generally concentrically about the longitudinal axis 36. The first surface portion 64 and the second surface portion 68 of the shank 34 each have respective diameters extending generally perpendicularly through the longitudinal axis 36 that are approximately equal in size to one another. If desired, the diameter of the first surface portion 64 of the shank 34 may be smaller than the diameter of the second surface portion 68. The cylindrical surface 46 formed by the groove 44 has a diameter that is smaller or shorter than the diameter of the first surface portion 64 and that is smaller than the diameter of the second surface portion 68.

The pivot pin 30 also includes a head 76 attached to the shank 34 at the second end 40. The head 76 includes a generally spherical surface portion 78 and a lip 79 having a generally circular edge 80. The lip 79 extends radially outwardly from and circumferentially about the second end 40 of the shank 34. The circular edge 80 is located generally concentrically about the longitudinal axis 36 and is located radially outwardly beyond the second surface portion 68 of the shank 34 relative to the longitudinal axis 36. The diameter of the second surface portion 64 of the shank 34 is sized to allow the pivot pin 30 to fit closely within the bores 18 and 20 of the coupler body 16 and the bore 22 of the knuckle 12. The head 76 and its lip 79 and circular edge 80 have a diameter that is larger than the second surface portion 68 such that the head 76 will not fit through the bores 18, 20 or 22. The head 76 thereby prevents the second end 40 of the pivot pin 30 from sliding through the knuckle 12 or body 16 of the coupler 14.

The head 76 may be formed in other ways as are well known in the art. The second end 40 of the shank 34 may be splayed outwardly such that the second end 40 of the shank 34 has a diameter that is larger than the diameter of the second surface portion 68 and the diameter of the bores 18, 20 and 22. The head may also be formed by a pin or lug that projects outwardly beyond the second surface portion 68. Alternatively, a second groove, such as the groove 44, may be formed at the second end 40 of the shank 34 which is adapted to receive and retain a second retention clip member 32.

The pivot pin 30 is formed from steel preferably having a minimum yield strength of 90,000 pounds per square inch. The pivot pin 30 is also preferably heat-treated and has a hardness ranging between 228 Brinell (20 Rockwell C) and 429 Brinell (45 Rockwell C).

As best shown in FIGS. 2 and 3, the retention clip member 32 includes a resiliently flexible generally circular band 90 extending between a first end 92 and a second end 94. As shown in FIG. 2, the band 90 overlaps itself such that the second end 94 extends past and is located beyond the first end 92. A first tab 96 extends generally radially outwardly from the first end 92 of the band 90. A second tab 98 extends generally radially outwardly from the second end 94 of the band 90. The band 90 and the tabs 96 and 98 as shown in FIGS. 2 and 3 are formed from a single strand of circular steel wire but may be formed in other ways.

As shown in FIG. 3, the band 90 of the retention clip member 32 is resiliently flexible between a relaxed position as shown in solid lines in FIG. 3 and an expanded position as shown in dashed lines in FIG. 3. When the retention clip member 32 is in the relaxed position, the band 90 is unflexed and is not subject to any bending stresses and the first end 92 is located a first distance from the second end 94. In the relaxed position, the circular band 90 has an internal diameter that is larger than the diameter of the cylindrical surface 46 formed by the groove 44, but that is smaller than the diameter of the first surface portion 64 of the shank 34 and of the outer circular edge 52 of the first side wall 40 of the groove 44. Thus when the retention clip member 32 is located within the groove 44 in the relaxed position, the band 90 does not grippingly engage the grooved surface 46 and may freely rotate relative to the pivot pin 30 about the longitudinal axis 36. However, the band 90 will engage the first side wall 48 of the groove 44 when it is in the relaxed position to prevent the retention clip member 32 from being slid longitudinally over the first surface portion 64 and off of the shank 34. As the band 90 completely surrounds and encircles the grooved surface 46, the retention clip member 32 cannot be removed from the pivot pin 30 by moving or pulling the retention clip member 32 in a direction lateral or perpendicular to the longitudinal axis 36 of the shank 34, and can only be removed from the pivot pin 30 by moving the retention clip member 32 longitudinally along the longitudinal axis 36 and over the first end 38 of the shank 34.

The retention clip member 32 may be resiliently flexed from the relaxed position to an expanded position by the application of manual finger-tip force upon the tabs 96 and 98. When the tabs 96 and 98 are pressed towards one another, the first end 92 of the band 90 moves towards the second end 94 of the band 90. In the expanded position the first end 92 is located a second distance from the second end 94 which is shorter than the first distance between the ends 92 and 94 when the retention clip member 32 is in the relaxed position. The internal diameter of the band 90 in the expanded position is larger than the internal diameter of the band 90 in the relaxed position. When the retention clip member 32 is flexed to the expanded position, the internal diameter of the band 90 is larger than the diameter of the first surface portion 64 of the shank 34 and of the outer circular edge 52 of the first side wall 48 of the groove 44 such that the retention clip member 32 may be slid along the longitudinal axis 36 out of the groove 44 and off of the pivot pin 30 over the first surface portion 64. The retention clip member 32 may be selectively placed within the groove 44 in a similar but reverse manner. The first tab 96 and second tab 98 are manually pressed together to place the retention clip member 32 in the expanded position. The band 90 is then slid over the first end 38 of the first surface portion 64 of the shank 34 to the groove 44 wherein the tabs 96 and 98 are released and whereupon the band 90 resiliently returns to the relaxed position.

When the retention clip member 32 is removed from the pivot pin 30, the first end 38 of the pivot pin 30 may be slid through the knuckle 12 and body 16 of the coupler 14. When the retention clip member 32 is located within the groove 44, the band 90 extends completely around and encircles the cylindrical grooved surface 46 of the groove 44. When the retention clip member 32 is in the relaxed position, the band 90 cannot be slipped over the first surface portion 64 as the band 90 will engage the first side wall 48 formed by the groove 44. The tabs 96 and 98 project outwardly beyond the second surface portion 68 of the shank 34 such that the tabs 96 and 98 will engage the bottom lug of the coupler body 16 to prevent the first end 38 of the shank 34 from sliding through the knuckle 12 and coupler body 16 thereby retaining the pivot pin 30 to the coupler body 16 and knuckle 12. As the retention clip member 32 is freely rotatable about the longitudinal axis 36 with respect to the pivot pin 30, the retention clip member 32 will not prevent or inhibit rotation of the pivot pin 30 about the longitudinal axis 36. The same retention clip member 32 may be selectively placed within and removed from the groove 44 of the pivot pin 30 as often and as repeatedly as desired without having to replace the retention clip member 32 with a second retention clip member 32. If desired a cotter pin may be placed in the bore 60 of the pivot pin 30 if the retention clip member 32 should be lost or damaged.

FIG. 4 shows an alternate embodiment of the retention clip member 32 designated with the reference number 106. The retention clip member 106 includes a generally circular band 108 formed from a flat strap that extends between a first end 110 and a second end 112. The first end 110 includes a radially outwardly projecting first tab 114 and the second end 112 includes a radially outwardly projecting second tab 116. The second end 112 of the band 108 includes a slot through which the first end 110 of the band 108 extends. The retention clip member 106 is resiliently flexible and operates in the same manner as the retention clip member 32.

FIG. 5 shows a further alternate embodiment of the retention clip member 32 designated with the reference number 120. The retention clip member 120 is formed from a single strand of generally circular wire. The retention clip member 120 includes a generally circular band 122 formed by two generally circular wire portions overlying one another. The band 122 extends between a first end 124 and a second end 126. A first tab 128 is formed by the ends of the wire and extends radially outwardly from the first end 124 of the band 122. A second tab 130, formed as a loop of the wire, extends generally radially outwardly from the second end 126 of the band 122. The retention clip member 120 is resiliently flexible and operates in the same manner as the retention clip member 32.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. A selectively releasable locking assembly for a railroad car coupler adapted to pivotally connect a knuckle of the railroad car coupler to a body of the railroad car coupler, said locking assembly including:

a pivot pin including an elongate shank including a first end, a second end, and a longitudinal axis extending from said first end to said second end, said shank including a peripheral surface and a peripheral recessed groove formed in said shank spaced apart from said second end of said shank, said peripheral surface including a peripheral groove surface portion formed by said groove extending generally concentrically about said longitudinal axis; and a retention member adapted to be selectively connected to said shank within said groove, said retention member including a resiliently flexible band extending between a first end and a second end, a first tab attached to and extending generally radially outwardly from said first end of said band and a second tab attached to said second end of said band, said band adapted to be inserted within said groove such that said band is located on diametrically opposite sides of said groove surface portion, said band being resiliently flexible such that said band may be manually flexed from a relaxed position wherein said first end of said band is located a first distance from said second end of said band to an expanded position wherein said first end of said band is located a second distance from said second end of said band, said retention member adapted to be retained in said groove when in said relaxed position and adapted to be selectively placed within or removed from said groove when in said expanded position by sliding said retention member longitudinally along the longitudinal axis of said pivot pin, said retention member adapted to prevent said first end of said pivot pin from sliding through the knuckle and body of the railroad car coupler when said retention member is located within said groove.

2. The locking assembly of claim 1 wherein said peripheral surface includes a first surface portion extending from said first end of said shank to said groove, said first surface portion having a first diameter, said peripheral groove surface portion having a second diameter that is shorter than said first diameter, and said band of said retention member being generally circular and having an internal diameter that is shorter than said first diameter and that is longer than said second diameter when said band is in said relaxed position, such that said band is retained within said groove when said retention member is in said relaxed position while said band may rotate with respect to said shaft about said longitudinal axis.

3. The locking assembly of claim 1 wherein said band of said retention member is generally circular and said first end of said band generally overlaps said second end of said band such that said band is flexed from said relaxed position to said expanded position by manually moving said first tab toward said second tab.

4. The locking assembly of claim 1 including a bore extending generally diametrically through said shank, said bore extending through said groove surface portion.

5. A selectively releasable locking assembly for a railroad car coupler adapted to pivotally connect a knuckle of the railroad car coupler to a body of the railroad car coupler, said locking assembly including:

a pivot pin including an elongate shank including a first end, a second end, and a longitudinal axis extending from said first end to said second end, said shank including a peripheral surface and a peripheral recessed groove formed in said shank spaced apart from said second end of said shank, said peripheral surface including a peripheral groove surface portion formed by said groove extending generally concentrically about said longitudinal axis; and a retention member adapted to be selectively connected to said shank within said groove, said retention member including a resiliently flexible generally circular band extending between a first end and a second end, said first end of said band generally overlapping said second end of said band, a first tab attached to said first end of said band and a second tab attached to said second end of said band, said band adapted to be inserted within said groove such that said band is located on diametrically opposite sides of said groove surface portion, said band being resiliently flexible such that said band may be manually flexed from a relaxed position wherein said first end of said band is located a first distance from said second end of said band to an expanded position wherein said first end of said band is located a second distance from said second end of said band by manually moving said first tab toward said second tab, said retention member adapted to be retained in said groove when in said relaxed position and adapted to be selectively placed within or removed from said groove when in said expanded position by sliding said retention member longitudinally along the longitudinal axis of said pivot pin, said retention member adapted to prevent said first end of said pivot pin from sliding through the knuckle and body of the railroad car coupler when said retention member is located within said groove.

\* \* \* \* \*